(12) United States Patent
Shanmugam et al.

(10) Patent No.: US 12,093,946 B2
(45) Date of Patent: Sep. 17, 2024

(54) METHOD, TRANSACTION MANAGEMENT DEVICE AND COMPUTER-READABLE MEDIA FOR FACILITATING CONCURRENT TRANSACTIONS

(71) Applicant: SINGAPORE AIRLINES LIMITED, Singapore (SG)

(72) Inventors: Arun Sabarirajan Shanmugam, Singapore (SG); Dinusha Weerasekara, Singapore (SG); Ranjith Kandacheri, Singapore (SG); Siakchuah Tan, Singapore (SG)

(73) Assignee: SINGAPORE AIRLINES LIMITED, Singapore (SG)

( * ) Notice: Subject to any disclaimer, the term of this patent is extended or adjusted under 35 U.S.C. 154(b) by 77 days.

(21) Appl. No.: 17/431,758

(22) PCT Filed: May 2, 2019

(86) PCT No.: PCT/SG2019/050249
§ 371 (c)(1),
(2) Date: Aug. 18, 2021

(87) PCT Pub. No.: WO2020/222701
PCT Pub. Date: Nov. 5, 2020

(65) Prior Publication Data
US 2022/0114582 A1 Apr. 14, 2022

(51) Int. Cl.
*G06Q 20/38* (2012.01)
*G06Q 20/22* (2012.01)
(Continued)

(52) U.S. Cl.
CPC ....... *G06Q 20/389* (2013.01); *G06Q 20/2295* (2020.05); *G06Q 20/3829* (2013.01);
(Continued)

(58) Field of Classification Search
CPC ............ G06Q 20/389; G06Q 30/0226; G06Q 2220/00; G06Q 30/0229; H04L 9/50
See application file for complete search history.

(56) References Cited

U.S. PATENT DOCUMENTS

| 7,676,432 B2 * | 3/2010 | Ling | G06Q 30/06 705/39 |
| 8,538,863 B1 * | 9/2013 | Saunders | G06Q 20/342 705/38 |

(Continued)

FOREIGN PATENT DOCUMENTS

WO  2017/187397 A1  11/2017

OTHER PUBLICATIONS

International Search Report for PCT/SG2019/050249 for Aug. 9, 2019.
Written Opinion for PCT/SG2019/050249 for Aug. 9, 2019.

*Primary Examiner* — Courtney P Jones
*Assistant Examiner* — Christine Dang
(74) *Attorney, Agent, or Firm* — Sughrue Mion, PLLC

(57) ABSTRACT

A method of facilitating concurrent blockchain transactions for a plurality of users in a transaction system having respective user blockchain accounts each having a token balance comprises providing, at a blockchain network, an aggregator account having a token balance; generating a plurality of child accounts of the aggregator account; periodically initiating, at the blockchain network, a plurality of top-up transactions to transfer tokens from the aggregator account to the plurality of child accounts; and concurrently incrementing the respective token balances for the plurality of users by initiating, at the blockchain network, a plurality of user top-up transactions to transfer tokens from the plurality of child accounts to the user blockchain accounts.

19 Claims, 7 Drawing Sheets

(51) Int. Cl.
  *H04L 9/32* (2006.01)
  *G06Q 30/0226* (2023.01)
  *H04L 9/00* (2022.01)

(52) U.S. Cl.
  CPC ....... *H04L 9/3236* (2013.01); *G06Q 30/0226* (2013.01); *G06Q 2220/00* (2013.01); *H04L 9/50* (2022.05); *H04L 2209/56* (2013.01)

(56) References Cited

U.S. PATENT DOCUMENTS

| | | | | |
|---|---|---|---|---|
| 10,755,261 B2 * | 8/2020 | Harper | .................. | G06Q 20/10 |
| 2002/0198803 A1 * | 12/2002 | Rowe | .................. | G07F 17/3281 |
| | | | | 705/35 |
| 2005/0192862 A1 * | 9/2005 | Modi | .................. | G06Q 30/0215 |
| | | | | 705/14.27 |
| 2005/0192896 A1 * | 9/2005 | Hutchison | .............. | G06Q 30/04 |
| | | | | 705/40 |
| 2006/0062144 A1 * | 3/2006 | Testa | ................... | H04L 47/10 |
| | | | | 370/411 |
| 2008/0228637 A1 * | 9/2008 | Scipioni | ................. | G06Q 40/02 |
| | | | | 705/35 |
| 2009/0154351 A1 * | 6/2009 | Kim | ........................ | H04L 47/50 |
| | | | | 370/235 |
| 2009/0288148 A1 | 11/2009 | Headley et al. | | |
| 2012/0323661 A1 * | 12/2012 | Otto | ....................... | G06N 5/025 |
| | | | | 705/14.25 |
| 2014/0006048 A1 * | 1/2014 | Liberty | .............. | G06Q 30/0241 |
| | | | | 705/2 |
| 2014/0344149 A1 * | 11/2014 | Campos | ............. | G06Q 20/3674 |
| | | | | 705/41 |
| 2016/0086160 A1 * | 3/2016 | Desai | ................. | G06Q 20/3223 |
| | | | | 705/41 |
| 2016/0210597 A1 * | 7/2016 | Zhu | ....................... | G06Q 20/26 |
| 2017/0200160 A1 * | 7/2017 | Kumar | ................ | G06Q 20/227 |
| 2017/0243193 A1 | 8/2017 | Manian et al. | | |
| 2018/0060860 A1 * | 3/2018 | Tian | .................... | G06Q 20/065 |
| 2018/0253702 A1 | 9/2018 | Dowding | | |
| 2019/0028276 A1 | 1/2019 | Pierce et al. | | |
| 2019/0130409 A1 * | 5/2019 | Barbuto | ............. | G06Q 20/367 |
| 2019/0318122 A1 * | 10/2019 | Hockey | ................ | H04L 63/102 |

* cited by examiner

METHOD, TRANSACTION MANAGEMENT DEVICE AND COMPUTER-READABLE MEDIA FOR FACILITATING CONCURRENT TRANSACTIONS

CROSS REFERENCE TO RELATED APPLICATIONS

This application is a National Stage of International Application No. PCT/SG2019/050249 filed May 2, 2019.

TECHNICAL FIELD

The present disclosure relates to a method, a transaction management device, and computer-readable media for facilitating concurrent transactions in a blockchain-based transaction system.

BACKGROUND

Blockchains provide an effective means for tracking the ownership of digital assets within a distributed ledger. A blockchain data structure is typically implemented as a list of records (or "blocks") that are linked and secured using cryptography. Each block contains a cryptographic hash of the previous block in addition to record data defining the block. Management of a blockchain structure involves generating and validating new blocks, and appending each newly generated block to the chain of existing blocks such that data is recorded in a verifiable and permanent way.

Due to their properties, blockchains are particularly well suited to recording transactions specifying an exchange of assets that has occurred between parties. Transactions are stored in batches within respective blocks of the data structure, thereby providing a permanent and readily accessible record of transaction activity.

The security of a blockchain structure, and therefore its suitability as a mechanism for recording transactions, is dependent on the decentralised nature of the system that maintains and updates the data structure. Specifically, a blockchain transaction processing system includes a plurality of nodes in the form of geographically distributed computing devices that are configured to maintain a copy of the data structure, and to modify the structure by performing the processes of block generation and validation in a distributed way.

Conventional blockchain transaction processing systems aim at implementing a Byzantine fault-tolerant replicated state machine (RSM) by totally ordering blocks or sets of transactions that are issued by requesters. Specifically, the total ordering of transactions into blocks is achieved by the generation of new blocks containing transaction data, and a decision process by which each newly generated block is (or is not) added to the chain structure to commit (or reject) the transaction (i.e. the process of "deciding" the block). As a consequence of the distributed nature of the blockchain structure, transaction processing requires that consensus be reached between the nodes of the system to determine the form and structure of each new block (i.e. which transaction data to include). Permissionless blockchains allow any of the nodes of the system to be the deciders of new transaction blocks, while permissioned systems confine the decision making to a predetermined fixed set of nodes. The transaction data itself must also be verified as correct before being committed (i.e. added to the chain within a block) such that the integrity of the chain is maintained.

A key feature of blockchain-based transaction systems is the prevention of double-spending. For example, in an Ethereum network, each account has an account nonce, also called a transaction nonce, associated with it. This is a counter which is incremented every time the account requests a transaction. Transaction requests issued by an account are not validated by nodes in the network unless they are unique and consecutive. That is, a transaction request having a nonce of N will not be validated until all requests with nonce up to N−1 have been validated.

In certain applications of blockchain, it may be desired to enable participants to transact with each other in non-crypto currencies, but using the blockchain for security and integrity purposes. An issue that may arise in this context, particularly for Ethereum-based networks, is in interfacing traditional payment systems or loyalty and rewards systems with the blockchain. In particular, the transaction speed is typically too slow to be satisfactory for point-of-sales applications.

It is desirable therefore to provide a method and system that can assist in facilitating concurrent transactions over a blockchain network.

SUMMARY

Disclosed herein is a method of facilitating concurrent blockchain transactions for a plurality of users in a transaction system having respective user blockchain accounts each having a token balance, the method comprising:
  providing, at a blockchain network, an aggregator account having a token balance;
  generating a plurality of child accounts of the aggregator account;
  periodically initiating, at the blockchain network, a plurality of top-up transactions to transfer tokens from the aggregator account to the plurality of child accounts; and
  concurrently incrementing the respective token balances for the plurality of users by initiating, at the blockchain network, a plurality of user top-up transactions to transfer tokens from the plurality of child accounts to the user blockchain accounts.

Said child accounts may be generated according to a load on the transaction system.

The method may comprise selecting child accounts for said user top-up transactions in accordance with one or more selection criteria.

The one or more selection criteria may include a round-robin selection criterion, selecting a child account that is the least recently used child account, or selecting a child account having the highest balance.

The method may be executed at least partly at a transaction management device that stores user account data for the users in isolation from a key vault that stores private keys for signing transactions initiated by respective ones of the users.

Also disclosed herein is a transaction management device for facilitating concurrent blockchain transactions for a plurality of users in a transaction system having respective user blockchain accounts each having a token balance, the transaction management device comprising at least one processor and computer-readable storage in communication with the at least one processor, the computer-readable storage having stored thereon instructions for causing the at least one processor to:
  generate, at a blockchain network, an aggregator account having a token balance;

generate a plurality of child accounts of the aggregator account;

periodically initiate, at the blockchain network, a plurality of top-up transactions to transfer tokens from the aggregator account to the plurality of child accounts; and concurrently increment the respective token balances for the plurality of users by initiating, at the blockchain network, a plurality of user top-up transactions to transfer tokens from the plurality of child accounts to the user blockchain accounts.

The computer-readable storage may have stored thereon instructions for causing the at least one processor to generate the child accounts according to a load on the transaction system.

Said instructions may further cause the at least one processor to select child accounts for said user top-up transactions in accordance with one or more selection criteria. The one or more selection criteria may include a round-robin selection criterion, selecting a child account that is the least recently used child account, or selecting a child account having the highest balance.

The transaction management device may further comprise a user database that stores user account data for the users, and a key vault that stores private keys for signing transactions initiated by respective ones of the users, wherein the user database is isolated from the key vault.

Also disclosed herein is one or more non-transitory computer-readable media having stored thereon computer-readable instructions that, when executed by at least one processor, cause the at least one processor to perform a method as disclosed herein.

BRIEF DESCRIPTION OF THE DRAWINGS

Some embodiments of methods and systems for facilitating concurrent blockchain transactions, in accordance with present teachings will now be described, by way of non-limiting example only, with reference to the accompanying drawings in which.

DETAILED DESCRIPTION

Figure 1:
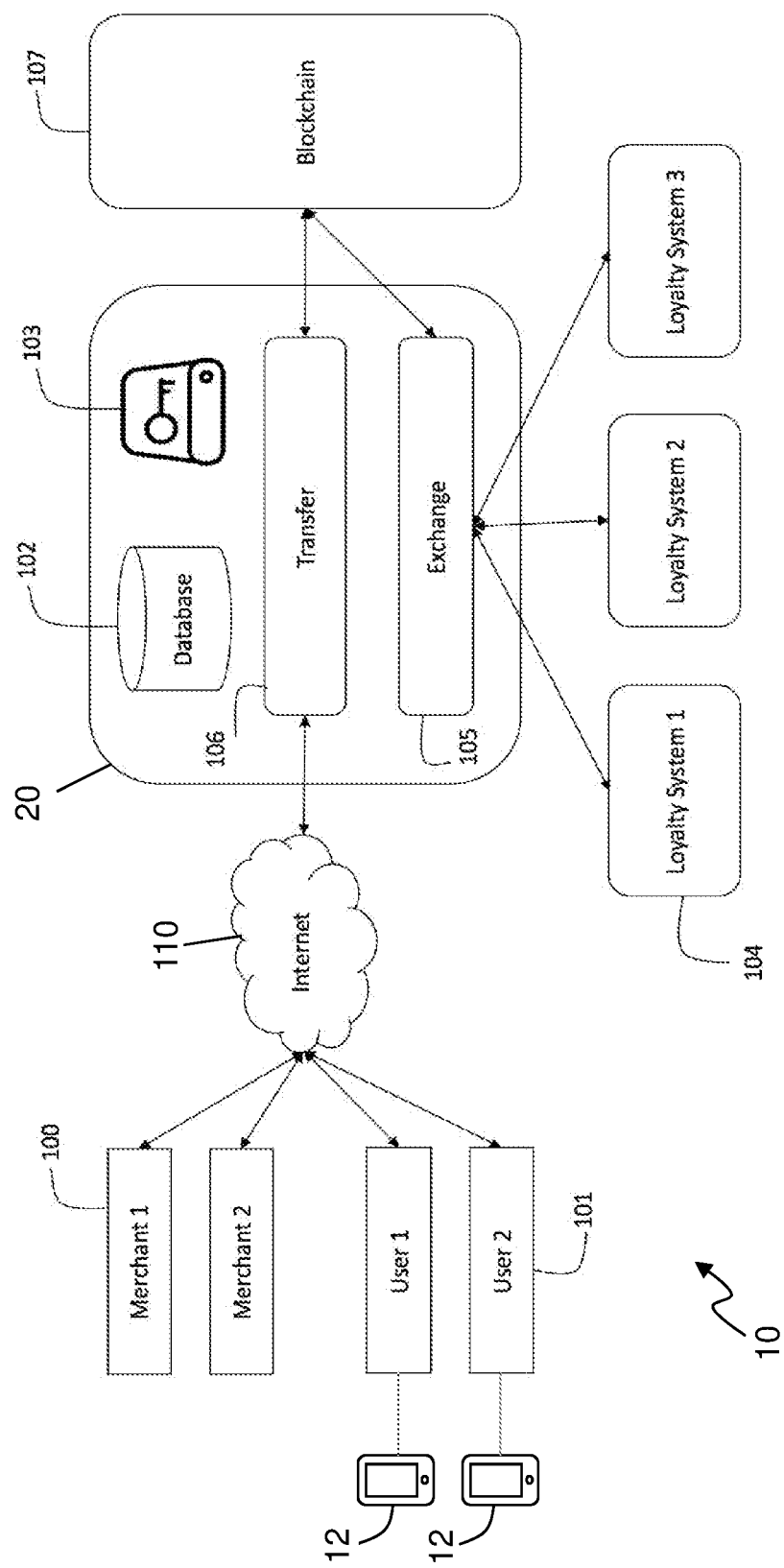
FIG. 1 is a block diagram of a blockchain-based transaction management system.

Referring to FIG. 1, there is shown a transaction system 10 including a transaction management device 20 that is in communication with a plurality of users 100, 101 over a communications system 110, such as the Internet. Some users 100 are merchants who may offer goods or services for sale, either in a physical store or in an online environment. Other users 101 are consumers who seek to purchase goods and services from the merchants 100, or in some circumstances, to transfer currency to, or receive it from, other users 101.

Users 100, 101 each have accounts maintained by transaction management device 20, and the account data may be stored in a user database 102. The user database 102 may be locally stored at transaction management device 20 or may be a remotely accessible database.

The transaction management device 20 is also in communication with one or more loyalty systems 104. Each loyalty system 104 maintains loyalty program accounts on behalf of users, and users may accrue point totals in their accounts according to transactions carried out with merchants, such as merchants 100. Points may accrue at different rates for different loyalty programs. Accordingly, transaction system 10 may include an exchange component 105 that allows a consumer user 101 to associate loyalty program identifiers with his or her account in user database 102, and to transfer accrued points from their loyalty program accounts to a common token that can be used for transactions with merchants 100, including merchants with which the consumer 101 has not been previously enrolled. The common token is a data object representing a medium of exchange in the system 10.

Each consumer user 101 enrolled with the transaction management device 20 has a digital wallet associated with their account, and which stores tokens for use in transactions with merchants 100. The digital wallet may be accessible via a web browser, or a dedicated application, such as an app 618 (FIG. 6) executing on a smartphone or other portable computing device 12. In addition to transactions with merchants 100, the digital wallet may include functionality for the consumer 101 to top-up their token account balance by various means, including with loyalty program points, or fiat currency. If loyalty program points are used for top-up, they are first translated to token value according to a prevailing exchange rate, by exchange component 105.

Transfers of value in the system 10, including account top-ups and other transactions, are effected via a blockchain network 107. To this end, the transaction management device 20 also includes a key vault 103 that stores the private keys of consumers 101, and merchants 100. The private keys are used to sign transactions that make use of blockchain network 107, but are never directly accessed by users 100, 101. Instead, users 100, 101 sign into their account at the transaction management device 20, for example via an account identifier and corresponding password. For example, a user 101 of a loyalty system 104 may create a transaction session by authenticating herself to the loyalty system 104 using a loyalty account identifier and password. Loyalty system 104 then provides an access token to transaction management device 20, which enables transaction management device 20 to access the user's 101 key in key vault 103, and to retrieve wallet details for user 101, for use in transactions while the user's session is active.

Advantageously, by maintaining a key vault 103 that is separate from user database 102, and avoiding storage of the user's private key on their device, the system 10 may avoid user losses that could otherwise be incurred due to a bad actor obtaining the user's private key.

The blockchain 107 may be a private blockchain, such as a permissioned Ethereum-based blockchain network. Alternatively, it may be a public blockchain.

The transaction management device 20 acts as an intermediary layer between merchants 100 and users 101 on the one hand, and blockchain network 107 on the other hand, by receiving input from merchants 100 and users 101 and translating the input into raw transactions that can be submitted to the blockchain network 107 in appropriate form.

Figure 2:
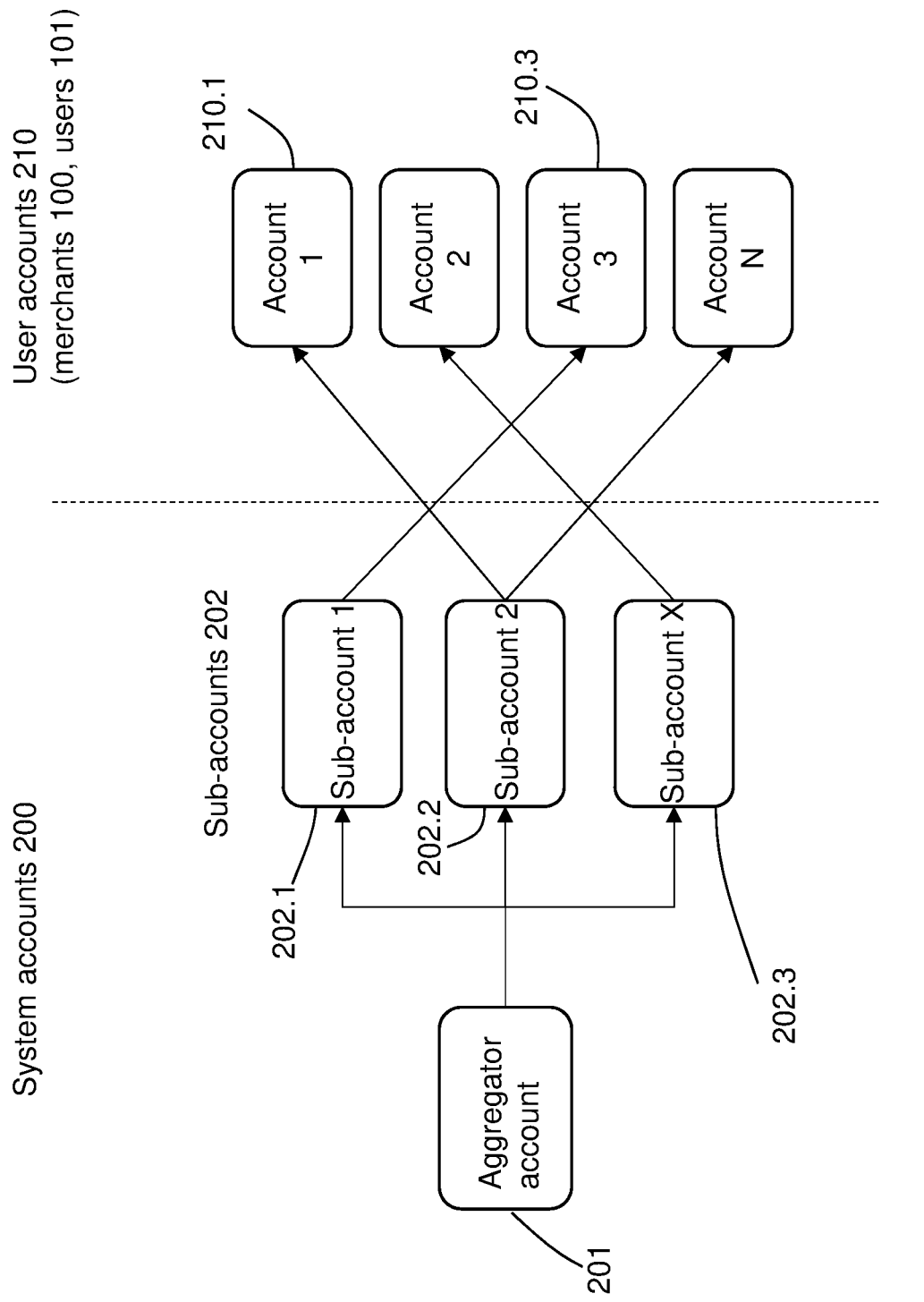
FIG. 2 schematically illustrates an account generation process in the system of FIG. 1.

Referring now to FIG. 2, an exemplary hierarchy of blockchain accounts in the system 10 is shown. The accounts comprise system accounts 200, including an aggregator account 201, and a series of sub-accounts (child accounts) 202 that are fed by the aggregator account 201. Three sub-accounts are shown in FIG. 2, but it will be appreciated that the number of sub-accounts may be as few as two, or may be greater than three, for example increasing proportionately to the number of users in the system 10.

The aggregator account 201 holds tokens that are minted, typically in a one-time process at initiation of the system 10 (though additional tokens may be minted should the number of users and/or loyalty programs increase beyond a certain threshold), and distributes the tokens to the sub-accounts 202.1, 202.2, 202.3 (hereafter collectively labelled as 202 for simplicity) such that the sub-accounts 202 may transact with user accounts 210. In particular, user accounts 210 may buy tokens from one of the sub-accounts 202, by exchanging loyalty points or fiat currency for tokens at an agreed exchange rate. Each user account 210 is associated with a wallet that is topped up with tokens by virtue of such exchanges. Each of the system accounts 200 and user accounts 210 may comprise a 40 character hexadecimal address that is a unique identifier for the account on the blockchain network 107.

Each request to top up a wallet is a blockchain transaction between a user account 210 and one of the sub-accounts 202. That is, a user request to top up their wallet is submitted as a request to transaction management system 20, 2U which then forms a transaction request to transfer tokens from one of the sub-accounts 202 to the user account 210, and then transmits the transaction request to blockchain network 107.

Although in principle it is possible for user accounts 210 to buy tokens directly from aggregator account 201, if there are many users attempting to top up their wallets at the same time, this may give rise to issues, for example in the case of a blockchain network 107 that uses transaction nonces to avoid double-spending. In such instances, the submission of multiple concurrent transactions to the blockchain network 107 will likely result in a race condition. By distributing tokens to multiple sub-accounts 202, which then act as intermediaries between loyalty systems 104 and the user accounts 210 on the blockchain network 107, the likelihood of a race condition is lessened or eliminated. Further, since multiple top-up transactions may be performed in parallel, response times for users 101 are greatly improved.

Once the wallet associated with a user account 210 has been loaded with tokens, the user may transact directly with other users who have accounts maintained at the transaction management device 20, without going via one of the sub-accounts 202. For example, a consumer user 101 having account 210.1 may send tokens to a merchant user 100 having account 210.3 by submitting a transaction request to transaction management system 20, such as via transfer component 106. Transfer component 106 may retrieve, from key vault 103, the private key of consumer 101, and generate a transaction request that includes the account identifier of the consumer 101, the account identifier of the merchant 100, and the number of tokens to transfer. The transaction request is signed by the private key of consumer 101 and submitted to the blockchain network 107 for validation.

Figure 3:
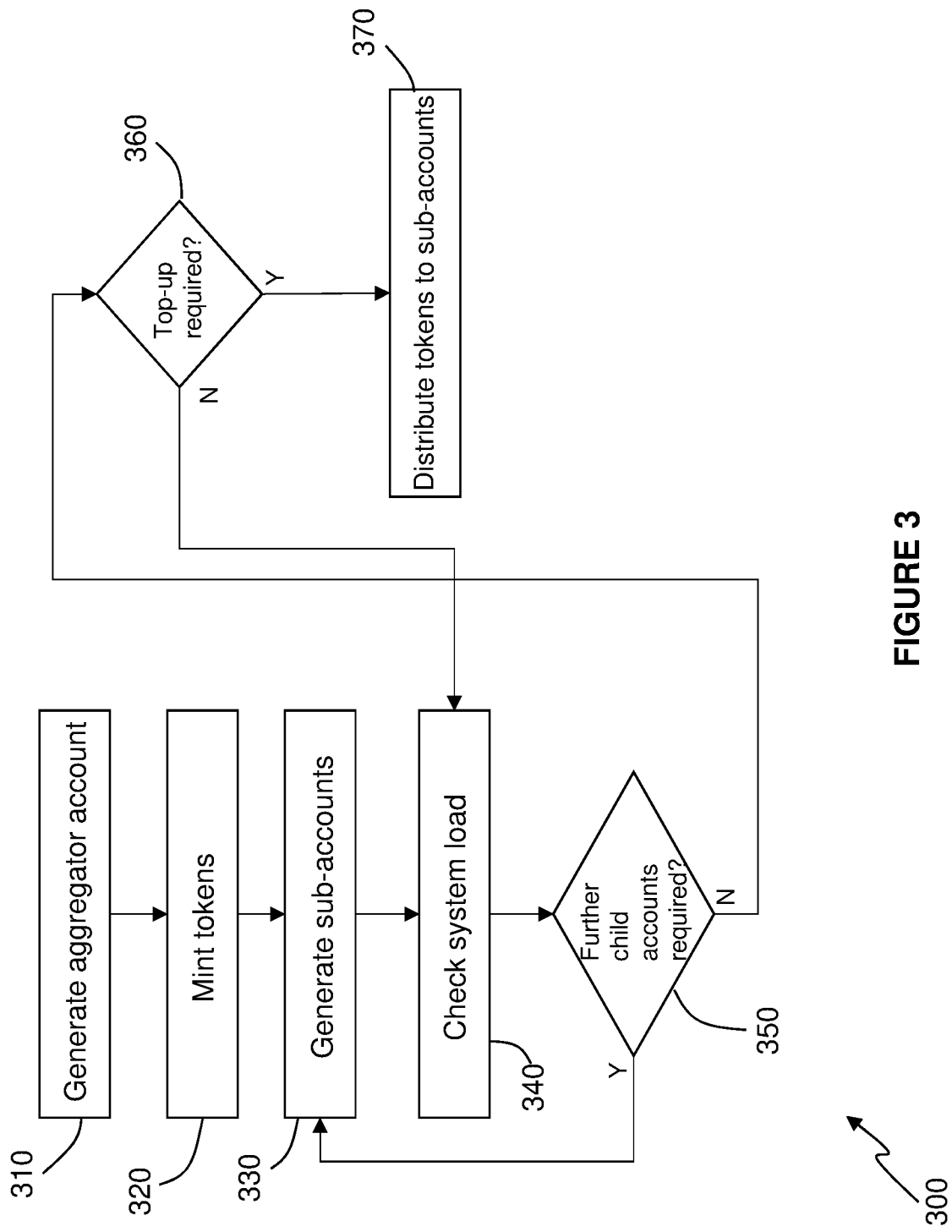
FIG. 3 is a flow diagram of an exemplary process for facilitating concurrent blockchain transactions.

Referring now to FIG. 3, a process 300 for facilitating concurrent blockchain transactions is shown in more detail.

The process 300 begins at block 310 by the transaction management device 20 generating an aggregator account 201. The transaction management device 20 may create an entry in user database 102 for the aggregator account 201 including an off-chain identifier for the aggregator account 201, and may make one or more API calls to blockchain network 107 to generate a blockchain account identifier and private key. The blockchain account identifier and private key may be stored in key vault 103. To enable an association of the private key with the aggregator account 201 for processing transaction requests, the blockchain account identifier may also be stored in the user database 102, or the off-chain identifier may be stored in the key vault 103 in association with the blockchain account identifier.

At block 320, the process 300 mints tokens by making a minting API call to the blockchain network 107, with the aggregator account 201 being the target account for the minted tokens to be assigned to.

At block 330, a plurality of sub-accounts 202 is generated. As for the aggregator account 201, an off-chain account identifier is stored in user database 102, and a blockchain account identifier and private key are generated via one or more API calls to blockchain network 107. The sub-account blockchain account identifier and private key are stored in key vault 103. The sub-account blockchain account identifier may also be stored in the user database 102, or the off-chain sub-account identifier may be stored in the key vault in association with the sub-account blockchain account identifier. This is done for each generated sub-account. The number of sub-accounts generated may be dependent on the number of users initially enrolled with the system 10, and thus the number of concurrent transactions that are desired, for example.

Optionally, during generation of the sub-accounts 202, an initial top-up process may be performed, in which at least some of the tokens in the aggregator account 201 are transferred to the sub-accounts. For example, a fixed percentage, such as 10%, of the total number of tokens in the aggregator account may be equally distributed amongst the sub-accounts with each sub-account receiving an initial top-up amount. The initial top-up process includes a series of blockchain transactions, each respective transaction request including the blockchain identifier of the aggregator account 201, the blockchain identifier of the respective sub-account 202, and an amount of tokens to transfer (this being the initial top-up amount), and being signed by the private key of the aggregator account 201.

At block 340, the transaction management device 20 checks the system load and determines, based on the load (e.g., the number of concurrent transactions occurring within a given time window), whether further child accounts may be required (block 350). If further accounts are required then the process returns to block 330 to generate further sub-accounts. Otherwise, the process 300 continues to block 360.

At block 360, the transaction management device 20 determines whether token balances of the sub-accounts 202 need to be incremented. The determination may be time-based, such that top-ups are triggered periodically (e.g., once per day), for example. Alternatively, a top-up may be triggered once one or more of the sub-accounts 202 falls below a certain balance.

If the initial top-up process was not performed as part of block 330, the token balances will be zero and thus at block 360, the transaction management device 20 may determine as a result that a top-up is required.

In the event that a top-up for one or more sub-accounts is required, at block 370 the transaction management device 20 performs one or more blockchain transactions to distribute tokens from the aggregator account 201 to the one or more sub-accounts. For example, the transaction management device 20 may determine for each sub-account a top-up amount that is a difference between the initial top-up amount and a current balance of the sub-account, and request, at blockchain network 107, a transaction that transfers the top-up amount from the aggregator account to the respective sub-account.

Advantageously, relatively few transactions are required between the aggregator account 201 and the sub-accounts 202, since these need to be conducted only on a sporadic basis to keep the sub-accounts 202 at an adequate balance to allow multiple transfers between the sub-accounts 202 and user accounts 210. Accordingly, the top-up process avoids a bottleneck that may occur due to a single blockchain account attempting to issue multiple transaction requests concurrently.

Figure 4:
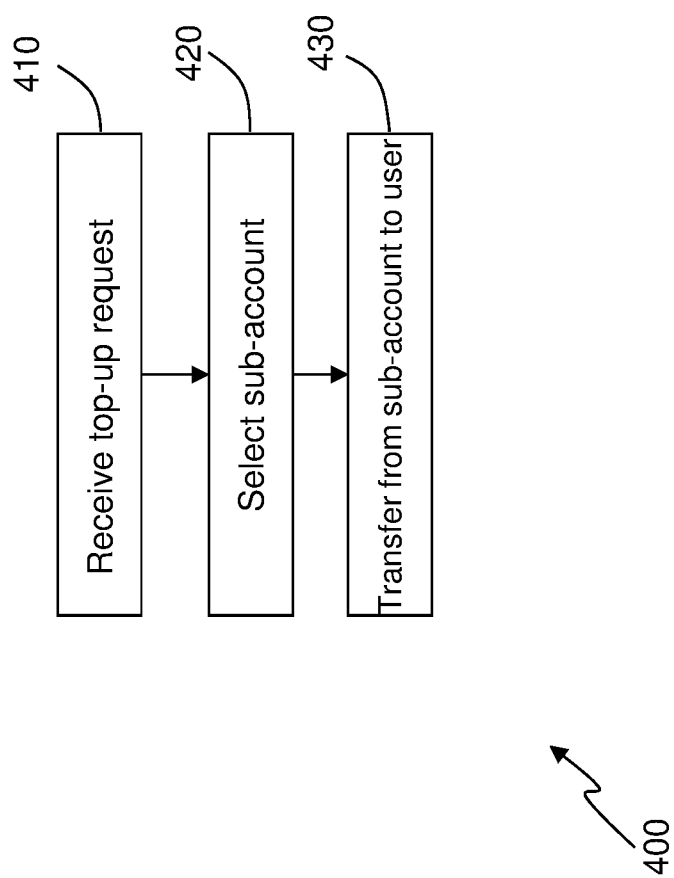
FIG. 4 is a flow diagram of an account top-up process.

Turning now to FIG. 4, there is shown an example of a user account top-up process 400 that may be implemented by the transaction management device 20, for example by transfer component 106, optionally in conjunction with exchange component 105.

At block 410, the transaction management device 20 receives a top-up request from a user 101, for example from a wallet application executing on the user's mobile device 12. The request may include an amount of a fiat currency and/or one or more amounts of loyalty points from respective loyalty programs. Exchange component 105 may translate the fiat currency and/or loyalty point amounts to a token value, according to appropriate exchange rates. For example, one loyalty point from a first loyalty system may equate to one token, while one loyalty point from a second loyalty system may equate to 0.5 tokens. The total requested token amount is then passed to transfer component 106, together with an identifier of the user, which may be provided to transaction management device 20 by the wallet application, for example.

At block 420, transfer component 106 receives the user identifier and total requested token amount and selects, from sub-accounts 202, a sub-account which will be used to top-up tokens into the user's blockchain account 210. For example, the transfer component 106 may select a sub-account randomly, or on a round-robin basis. Alternatively, the least recently used sub-account may be selected, or the sub-account with the highest current token balance may be selected. Combinations of these selection methods may also be used.

Once a sub-account is selected, transfer component 106 may check that the total requested token amount does not exceed the current balance of the sub-account. If not, then at block 430, transfer component 106 may form a transaction request including a blockchain account identifier of the sub-account, a blockchain account identifier of the user (retrieved from user database 102 or key vault 103, for example) and the total requested token amount, and sign the transaction request with the private key of the selected sub-account. The signed transaction request is then submitted to the blockchain network 107.

On successful validation of the transaction request, a validation response message may be sent from transfer component 106 to exchange component 105 to indicate a successful transaction, which in turn prompts exchange component 105 to decrement account balances (e.g., bank account balances and/or loyalty system points balances) by any amounts that were submitted by the user as part of the top-up request. Subsequently, the user's account balance is incremented by the total requested token amount, and the sub-account balance is decremented by same.

Figure 5:
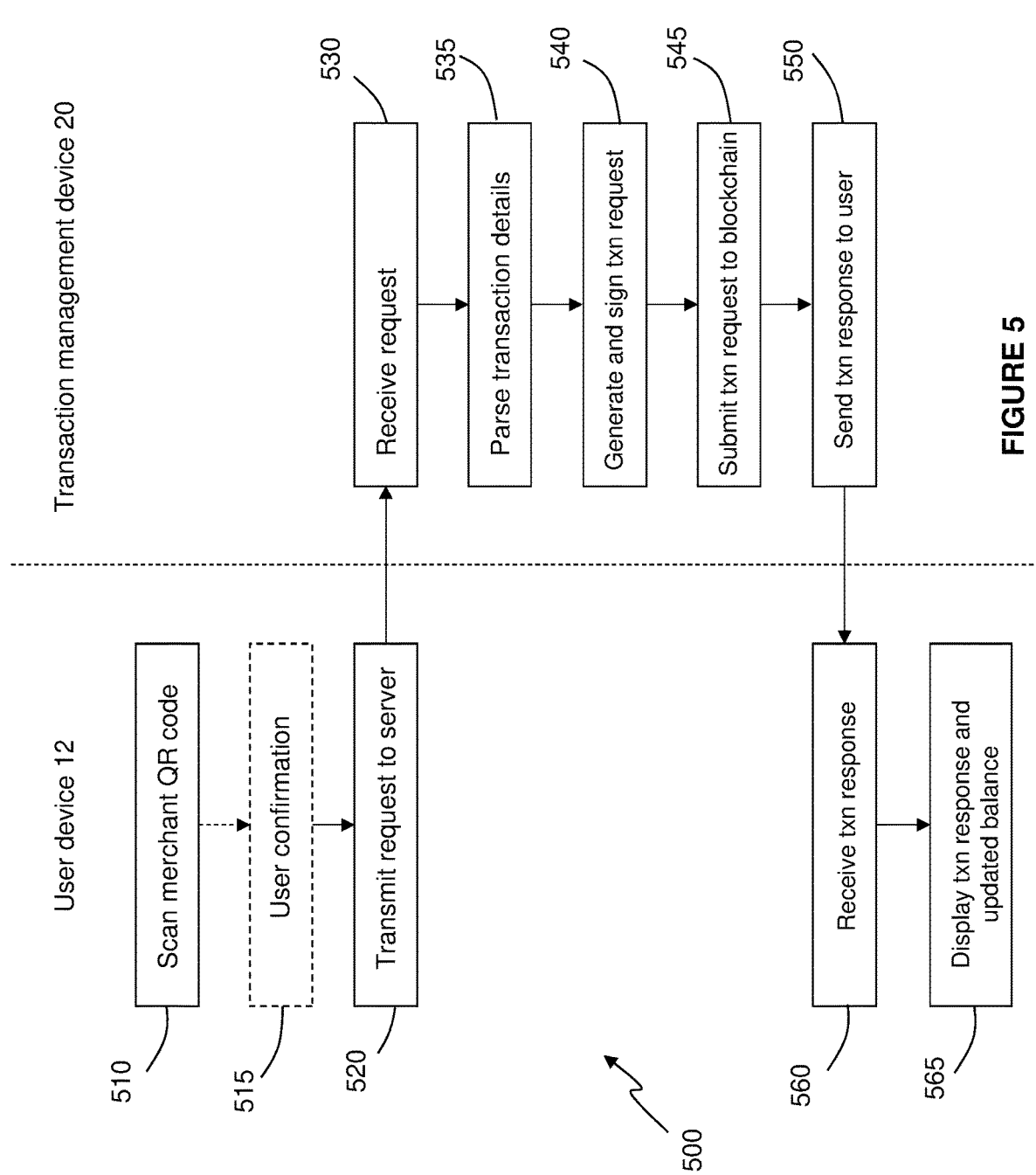
FIG. 5 is a flow diagram of a transaction process.

Turning now to FIG. 5, an embodiment of a transaction process 500 is shown.

At block 510, a user device 12, executing a wallet application for example, scans (using a camera 622) a merchant OR code in order to obtain a merchant identifier, a transaction amount in tokens, and optionally other information, such as product information. The merchant OR code may be presented on the screen of a payment terminal, for example. In some embodiments, the merchant OR code may include only a merchant identifier without encoding the transaction amount, and the user may manually enter the transaction amount at device 12. In some embodiments, the merchant and transaction information may instead be encoded in alternative form, such as an NFC tag or other machine-readable component.

Optionally, at block 515, the wallet application may request the user to confirm the transaction, for example by clicking a confirm button, or entering user identification data (such as a PIN for the device 12, or biometric information such as a fingerprint).

At block 520, the wallet application forms a transaction request message including at least a user identifier, the merchant identifier, and the transaction amount. User device 12 then transmits the transaction request message to the transaction management device 20.

At block 530, the transaction management device 20 receives the transaction request message, and at block 535, parses (for example, using transfer component 106) the transaction details to retrieve the user identifier, merchant identifier and transaction amount. Optionally, the transaction management device 20 may perform validation steps on the transaction details, such as confirming that the user identifier and merchant identifier are of the correct form, and are registered in user database 102.

At block 540, the transaction management device 20 generates a blockchain transaction request. The user identifier is mapped to the user's blockchain account identifier, and the merchant identifier is mapped to the merchant's blockchain account identifier, by database lookups in user database 102. A transaction request message including the respective blockchain account identifiers and the transaction amount is formed, and signed with the user's private key (retrieved by transaction management system 20 from key vault 103). Next, at block 545, the signed transaction request is submitted to blockchain network 107. The blockchain network 107 validates the signed transaction request by verifying the signature using the sender's public key.

At block 550, the transaction management device 20 receives confirmation that the transaction has been validated, and transmits the confirmation to user device 12. The user device 12 receives the confirmation at block 560, and displays it at block 565. The user device 12 may also display an updated account balance.

Mobile Computing Device 12

Figure 6:
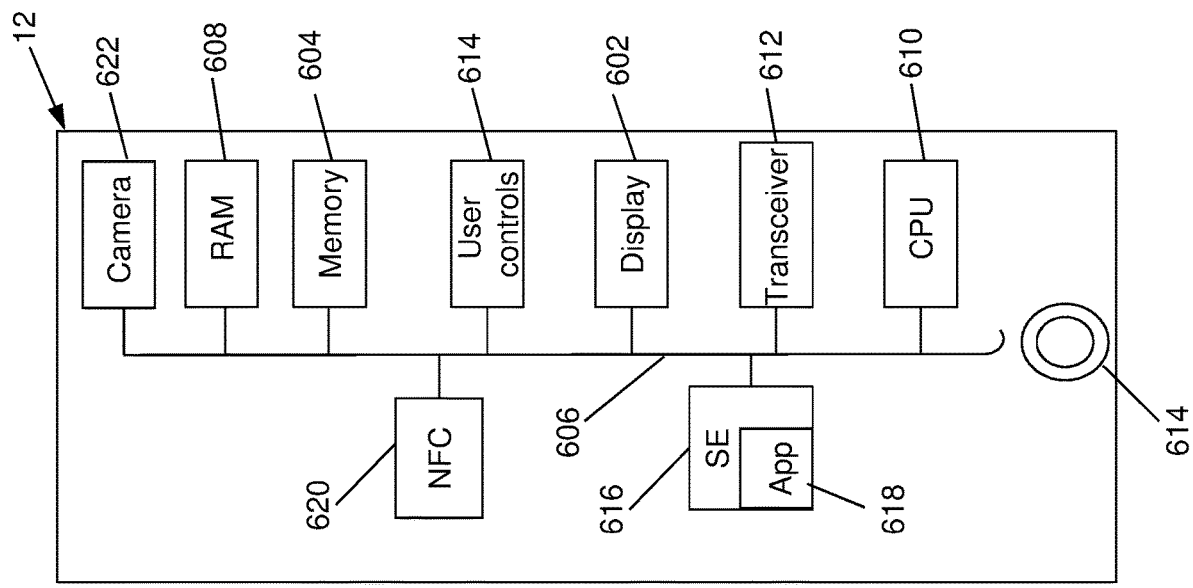
FIG. 6 is a block diagram of a user mobile computing device suitable for use with embodiments of the disclosure.

FIG. 6 is a block diagram showing an exemplary user device 12 in which embodiments of the invention may be practiced. The user device 12 may be a mobile computing device such as a smart phone, a personal data assistant (PDA), a palm-top computer, or a multimedia Internet enabled cellular telephone. For ease of description, the user device 12 is described below, by way of non-limiting example, with reference to a mobile device in the form of an iPhone™ manufactured by Apple™, Inc., or one manufactured by LG™, HTC™ and Samsung™, for example.

As shown, the user device 12 includes the following components in electronic communication via a bus 606:
- a display 602;
- non-volatile (non-transitory) memory 604;
- random access memory ("RAM") 608;
- N processing components 610;
- a transceiver component 612 that includes N transceivers;
- user controls 614;
- a secure element (SE) 616;
- a NFC controller 620; and
- a camera 622.

Although the components depicted in FIG. 6 represent physical components, FIG. 6 is not intended to be a hardware diagram. Thus, many of the components depicted in FIG. 6 may be realized by common constructs or distributed among additional physical components. Moreover, it is certainly contemplated that other existing and yet-to-be developed physical components and architectures may be utilized to implement the functional components described with reference to FIG. 6.

The display 602 generally operates to provide a presentation of content to a user, and may be realized by any of a variety of displays (e.g., CRT, LCD, HDMI, micro-projector and OLED displays).

In general, the non-volatile data storage 604 (also referred to as non-volatile memory) functions to store (e.g., persistently store) data and executable code.

In some embodiments for example, the non-volatile memory 604 includes bootloader code, modem software, operating system code, file system code, and code to facilitate the implementation components, well known to those of ordinary skill in the art, which are not depicted nor described for simplicity.

In many implementations, the non-volatile memory 604 is realized by flash memory (e.g., NAND or ONENAND memory), but it is certainly contemplated that other memory types may be utilized as well. Although it may be possible to execute the code from the non-volatile memory 604, the executable code in the non-volatile memory 604 is typically loaded into RAM 608 and executed by one or more of the N processing components 610.

The N processing components 610 in connection with RAM 608 generally operate to execute the instructions stored in non-volatile memory 604. As one of ordinarily skill in the art will appreciate, the N processing components 610 may include a video processor, modem processor, DSP, graphics processing unit (GPU), and other processing components.

The transceiver component 612 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

The user device 12 can execute mobile applications. The digital wallet application 618 could be a mobile application, web page application, or computer application. The digital wallet application 618 may be accessed by a computing device such as mobile computer device 12, computing device 20, or a wearable device such as a smartwatch. Although the digital wallet application 618 is shown as being resident on secure element 616, it will be appreciated that it may instead be stored on memory 604.

It should be recognized that FIG. 6 is merely exemplary and in one or more exemplary embodiments, the functions described herein may be implemented in hardware, software, firmware, or any combination thereof. If implemented in software, the functions may be transmitted or stored as one or more instructions or code encoded on a non-transitory computer-readable medium 604. Non-transitory computer-readable medium 604 includes both computer storage medium and communication medium including any medium that facilitates transfer of a computer program from one place to another. A storage medium may be any available medium that can be accessed by a computer.

Transaction Management Device 20

Figure 7:
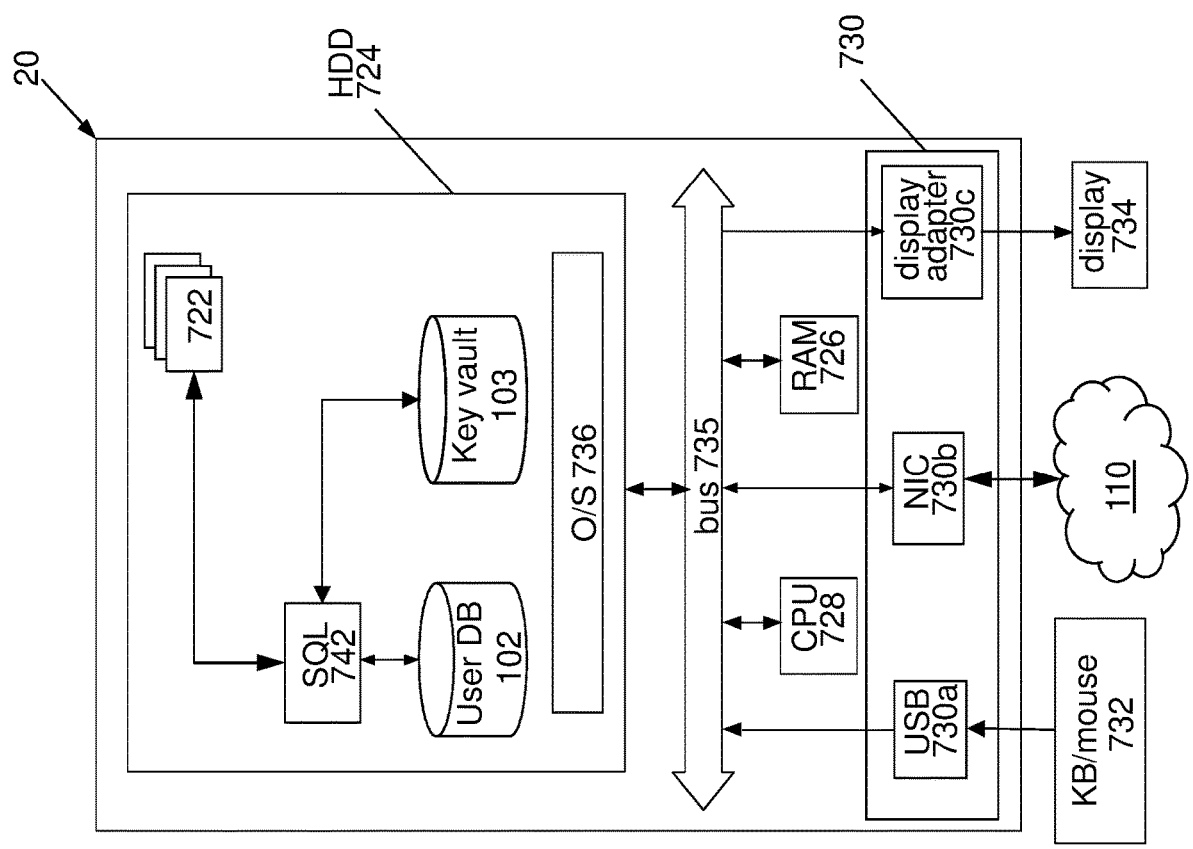
FIG. 7 is a block diagram of a transaction management computing device in accordance with certain embodiments.

FIG. 7 shows an example computing device 20 that is capable of implementing a transaction management device of the system 10. In some embodiments, a transaction management device may comprise multiple such computing devices 20.

The components of the computing device 20 can be configured in a variety of ways. The components can be implemented entirely by software to be executed on standard computer server hardware, which may comprise one hardware unit or different computer hardware units distributed over various locations, which may communicate over a network. A number of the components or parts thereof may also be implemented by application specific integrated circuits (ASICs) or field programmable gate arrays.

In the example shown in FIG. 7, the computing device 20 is a commercially available server computer system based on a 32 bit or a 64 bit Intel architecture, and the processes and/or methods executed or performed by the computing device 20 are implemented in the form of programming instructions of one or more software components or modules 722 stored on non-volatile (e.g., hard disk) computer-readable storage 724 associated with the computing device 20.

At least parts of the software modules 722 could alternatively be implemented as one or more dedicated hardware components, such as application-specific integrated circuits (ASICs) and/or field programmable gate arrays (FPGAs).

The computing device 20 includes at least one or more of the following standard, commercially available, computer components, all interconnected by a bus 735:
- random access memory (RAM) 726;
- at least one computer processor 728, and
- external computer interfaces 730:
  - universal serial bus (USB) interfaces 730a (at least one of which is connected to one or more user-interface devices, such as a keyboard, a pointing device (e.g., a mouse 732 or touchpad),
  - a network interface connector (NIC) 730b which connects the computer device 20 to a data communications network such as the Internet 110; and
  - a display adapter 730c, which is connected to a display device 734 such as a liquid-crystal display (LCD) panel device.

The computing device 20 includes a plurality of standard software modules, including:
- an operating system (OS) 736 (e.g., Linux or Microsoft Windows); and
- structured query language (SQL) modules 742 (e.g., MySQL, available from http://www.mysql.com), which allow data to be stored in and retrieved/accessed from an SQL database 102.

The computing device 20 also includes a key vault 103 that stores the private keys of users 101 (and merchants 100) that are used to sign transactions that make use of blockchain network 107. The key vault 103 is isolated from user database 102, such that a separate set of access credentials is required to access data in the key vault 103.

Advantageously, the user database 102 forms part of the computer readable data storage 724. Alternatively, the user database 102 is located remote from the transaction management device 20 shown in FIG. 7.

The boundaries between the modules and components in the software modules 722 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the computing device 20 may be executed by a module (of software modules 722) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module. Software modules 722 may comprise the exchange component 105 and transfer component 106, for example. Software modules 722 may also comprise a cryptographic module for encrypting, decrypting and validating encrypted data in processes executed by the computing device 20, and for accessing data stored in key vault 103.

In some embodiments, the key vault 103 may only be accessible by processes executing in a secured environment. For example, the key vault 103 may only be accessible by the cryptographic module, or part thereof, that executes in a dedicated secure cryptoprocessor of the one or more processors 728, or a trusted execution environment (TEE) of the one or more processors 728.

The computing device 20 normally processes information according to a program (a list of internally stored instructions such as a particular application program and/or an operating system) and produces resultant output information via input/output (I/O) devices 730. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Many modifications will be apparent to those skilled in the art without departing from the scope of the present invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A method of facilitating concurrent blockchain transactions for a plurality of users in a transaction system having respective user blockchain accounts each having a token balance, the method comprising:
   providing, at a blockchain network, an aggregator account having a token balance;
   generating two or more child accounts of the aggregator account, the two or more child accounts and the aggregator account being system accounts, which are different from the user blockchain accounts;
   periodically initiating, at the blockchain network, a plurality of top-up transactions to transfer tokens from the aggregator account to the two or more child accounts;
   receiving a user top-up request from the user blockchain accounts corresponding to the plurality of users;
   concurrently incrementing the respective token balances for the plurality of users by initiating, at the blockchain network, a plurality of user top-up transactions to transfer tokens from the two or more child accounts to the user blockchain accounts;
   checking a number of concurrent transactions occurring on the transaction system within a period of time;
   determining that one or more additional child accounts are required when the number of concurrent transactions occurs within the period of time; and
   generating one or more additional child accounts based on the determination that the one or more additional child accounts are required,
   wherein the two or more child accounts of the system accounts are configured to perform the user top up transactions with user blockchain accounts of multiple users, among the user blockchain accounts, in parallel.

2. The method according to claim 1, wherein said number of concurrent transactions occurring on the transaction system corresponds to a load on the transaction system.

3. The method according to claim 1, comprising selecting child accounts for said user top-up transactions in accordance with one or more selection criteria.

4. The method according to claim 3, wherein the one or more selection criteria include a round-robin selection criterion, selecting a child account that is the least recently used child account, or selecting a child account having the highest balance.

5. The method according to claim 1, wherein the method is executed at least partly at a transaction management device that stores user account data for the users separately from a key vault that stores private keys for signing transactions initiated by a respective user, among the users.

6. A transaction management device for facilitating concurrent blockchain transactions for a plurality of users in a transaction system having respective user blockchain accounts each having a token balance, the transaction management device comprising at least one processor and computer-readable storage in communication with the at least one processor, the computer-readable storage having stored thereon instructions for causing the at least one processor to:
   generate, at a blockchain network, an aggregator account having a token balance;
   generate two or more child accounts of the aggregator account, the two or more child accounts and the aggregator account being system accounts, which are different from the user blockchain accounts;

periodically initiate, at the blockchain network, a plurality of top-up transactions to transfer tokens from the aggregator account to the two or more child accounts;

receiving a user top-up request from the user blockchain accounts corresponding to the plurality of users; concurrently increment the respective token balances for the plurality of users by initiating, at the blockchain network, a plurality of user top-up transactions to transfer tokens from the two or more child accounts to the user blockchain accounts;

check a number of concurrent transactions occurring on the transaction system within a period of time;

determine that one or more additional child accounts are required when the number of concurrent transactions occurs within the period of time; and generate one or more additional child accounts based on the determination that the one or more additional child accounts are required, wherein the two or more child accounts of the system accounts are configured to perform the user top up transactions with user blockchain accounts of multiple users, among the user blockchain accounts, in parallel.

7. The transaction management device according to claim 6, wherein said number of transactions occurring on the transaction system corresponds to a load on the transaction system.

8. The transaction management device according to claim 6, wherein said instructions further cause the at least one processor to select child accounts for said user top-up transactions in accordance with one or more selection criteria.

9. The transaction management device according to claim 8, wherein the one or more selection criteria include a round-robin selection criterion, selecting a child account that is the least recently used child account, or selecting a child account having the highest balance.

10. The transaction management device according to claim 6, further comprising a user database that stores user account data for the users, and a key vault that stores private keys for signing transactions initiated by a respective user, among the users, wherein the user database is isolated from the key vault.

11. A non-transitory computer-readable storage having stored thereon computer-readable instructions that, when executed by at least one processor, cause the at least one processor to perform a method of facilitating concurrent blockchain transactions for a plurality of users in a transaction system having respective user blockchain accounts each having a token balance, the method comprising:

providing, at a blockchain network, an aggregator account having a token balance;

generating two or more child accounts of the aggregator account, the two or more child accounts and the aggregator account being system accounts, which are different from the user blockchain accounts;

periodically initiating, at the blockchain network, a plurality of top-up transactions to transfer tokens from the aggregator account to the two or more child accounts;

receiving a user top-up request from the user blockchain accounts corresponding to the plurality of users;

concurrently incrementing the respective token balances for the plurality of users by initiating, at the blockchain network, a plurality of user top-up transactions to transfer tokens from the plurality of child accounts to the user blockchain accounts;

checking a number of concurrent transactions occurring on the transaction system within a period of time;

determine that one or more additional child accounts are required when the number of concurrent transactions occurs within the period of time; and generate one or more additional child accounts based on the determination that the one or more additional child accounts are required, wherein the two or more child accounts of the system accounts are configured to perform the user top up transactions with user blockchain accounts of multiple users, among the user blockchain accounts, in parallel.

12. The non-transitory computer-readable storage according to claim 11, wherein the number of transactions occurring on the transaction system corresponds to a load on the transaction system.

13. The non-transitory computer-readable storage according to claim 11, wherein the method comprises selecting child accounts for said user top-up transactions in accordance with one or more selection criteria.

14. The non-transitory computer-readable storage according to claim 13, wherein the one or more selection criteria include a round-robin selection criterion, selecting a child account that is the least recently used child account, or selecting a child account having the highest balance.

15. The non-transitory computer-readable storage according to claim 11, wherein the method is executed at least partly at a transaction management device that stores user account data for the users separately from a key vault that stores private keys for signing transactions initiated by a respective user, among the users.

16. The method according to claim 1, wherein the number of concurrent transactions are transactions within a time window.

17. The transaction management device according to claim 6, wherein the number of concurrent transactions are transactions within a time window.

18. The non-transitory computer-readable storage according to claim 11, wherein the number of transactions are transactions within a time window.

19. The method according to claim 1, further comprises performing the plurality of user top-up transactions to transfer tokens from the two or more child accounts to the user blockchain accounts based on one or more user top-up requests from the user blockchain accounts corresponding to the plurality of users.

* * * * *